United States Patent

Baur et al.

Patent Number: 5,500,323
Date of Patent: Mar. 19, 1996

[54] CHARGE CONTROL WITH CYCLIC POLYSULFONYLDIALLY AMMONIUM SALTS

[75] Inventors: Rüdiger Baur, Eppstein/Taunus; Hans-Tobias Macholdt, Darmstadt; Wilfried Theiss, Flörsheim/Main, all of Germany

[73] Assignee: Hoechst AG, Germany

[21] Appl. No.: 430,181

[22] Filed: Apr. 27, 1995

Related U.S. Application Data

[63] Continuation of Ser. No. 188,203, Jan. 27, 1994, abandoned.

[30] Foreign Application Priority Data

Jan. 30, 1993 [DE] Germany .............. 43 02 644.3

[51] Int. Cl.$^6$ .................................. G03G 5/00
[52] U.S. Cl. .............. 430/110; 430/137; 526/295
[58] Field of Search ..................... 430/110, 137

[56] References Cited

U.S. PATENT DOCUMENTS 5,268,248  12/1993  Tanikawa ................. 430/106
5,275,904   1/1994  Shimizu .................. 430/109

FOREIGN PATENT DOCUMENTS 79964  5/1982  Japan .

*Primary Examiner*—Christopher Henderson
*Attorney, Agent, or Firm*—Connolly & Hutz

[57] ABSTRACT

Cyclic polysulfonyldiallylammonium salts which are obtainable by a) copolymerization of salts, preferably halides, of monomeric diallylammonium components of the formula (I)

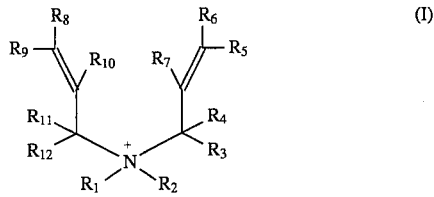

with sulfur dioxide or a compound which liberates sulfur dioxide, and b) anion exchange, the anions, preferably the halide ions, of the diallylammonium components being completely or partially replaced by the anions A, the diallylammonium components being in each case cyclized to give a five- or six-membered ring and being connected to one another by one or more divalent radicals —$SO_2$— to form polymers, the polysulfonyldiallylammonium salts having a molecular weight of between 500 and 5,000,000, and the ratio of the number of diallylammonium components to the number of divalent $SO_2$ radicals being from 1:0.01 to 1:100, and A is in each case the stoichiometric anion equivalent of an inorganic anion; of an anion of a heteropolyacid or of a borate of the formula (II) or of an organic anion, or a disulfopyrrolidinium betaine of the formula (III)

or A is a combination of the abovementioned anions; are employed individually or in combination as charge control agents in electrophotographic toners and developers which are employed for copying and reproducing originals and for printing electronically, magnetically or optically stored information or in colorproofing, and as charge control agents in powders and powder coatings.

11 Claims, No Drawings

CHARGE CONTROL WITH CYCLIC POLYSULFONYLDIALLY AMMONIUM SALTS

CROSS-REFERENCES TO RELATED APPLICATIONS

This application is a continuation application of Ser. No. 188,203, filed Jan. 27, 1994, now abandoned.

BACKGROUND OF THE INVENTION

1. Field of the Invention

The present invention derives from the technical field of charge control agents, in toners and developers for electrophotographic recording processes and in powders and powder coatings for surface coating.

In electrophotographic recording processes a "latent charge image" is produced on a photoconductor, for example by charging a photoconductor by corona discharge and then subjecting the electrostatically charged surface of the photoconductor to imagewise exposure, which causes a discharge to the earthed substrate on the exposed areas. The "latent charge image" thus produced is then developed by applying a toner. In the next step, the toner is transferred from the photoconductor to, for example, paper, textiles, foils or plastic, and is fixed, for example by means of pressure, radiation, heat or the effect of solvent. The used photoconductor is then cleaned and is ready for a new recording process.

Numerous patents describe the optimization of toners, and investigate the effect of the toner binder (variation of resin/resin components or wax/wax components), the effects of carriers (in two-component developers) and of magnetic pigments (in one-component developers).

One measure of the quality of a toner is its specific charge q/m (charge per unit mass). In addition to the sign and level of the electrostatic charge, the principal, decisive quality criteria are the rapid attainment of the desired charge level and the constancy of this charge over a relatively long activation period. This is of central importance in practice insofar as the toner in the developer mixture may undergo activation for a considerable period before being transferred to the photoconductor, since in some cases it remains in the developer mixture for a period covering the production of up to several thousand copies. In addition to this, the insensitivity of the toner to climatic effects such as temperature and atmospheric humidity is a further important criterion for its suitability.

2. Description of the Prior Art

Both positively and negatively chargeable toners are used in copiers and laser printers, depending on the type of process and type of apparatus.

To obtain electrophotographic toners or developers having either a positive or a negative charge, it is common to add so-called charge control agents. In this context it is not only the sign of the charge control but also the extent of the control effect which is important, since higher activity allows a smaller amount to be used. Since the charge of toner binders is generally heavily dependent on the activation period, the function of a charge control agent is, on the one hand, to set the sign and level of the toner charge and, on the other hand, to counteract the charge drift of the toner binder and to ensure a constant toner charge.

Charge control agents which are not able to prevent the toner or developer showing a high charge drift (aging) during a prolonged period of use, and which may even cause the toner or developer to undergo charge inversion, are therefore unsuitable for use in practice.

Full-color copiers and laser printers operate according to the principle of trichromatism, necessitating exact color matching of the three primary colours (yellow, cyan and magenta). The slightest shift in hue of even only one of the three primary colours urgently requires a shift in hue of the two other colors, so as to enable necessarily full-color copies and prints which are true to the original to be produced in this case too. Because of this precise matching of the color properties of the individual colorants to one another in color toners, it is especially important that charge control agents do not have an inherent color.

In color toners, in addition to the precisely defined requirements in terms of color, the three toners yellow, cyan and magenta must also be matched exactly to one another in terms of their triboelectric properties. This triboelectric matching is required because, in full-color printing or in full-color copying, the three color toners (or four color toners if black is included) have to be transferred in succession in the same apparatus.

It is known that colorants may in some cases have a sustained effect on the triboelectric charge of toners (H.-T. Macholdt, A. Sieber, Dyes & Pigments 9 (1988), 119–127). Because of the different triboelectric effects of colorants and the resulting effect, sometimes very pronounced, on toner chargeability, it is not possible simply to add the colorants to a toner base formulation made available at the start. On the contrary, it may be necessary to make available for each colorant an individual formulation to which the nature and amount of the required charge control agent are tailored specifically. This procedure is, accordingly, laborious and, in the case of color toners for the three-color process, represents a further difficulty in addition to those already described.

Consequently, highly effective, colorless charge control agents are required which are able to compensate for the different triboelectric characteristics of different colorants and to give the toner the desired charge. In this way, colorants which are very different triboelectrically can be employed in the various toners required (yellow, cyan, magenta and if desired black) using one and the same charge control agent, on the basis of a toner base formulation made available at the start. Another important practical requirement is that the charge control agents should have high thermal stability and good dispersibility. Typical temperatures at which charge control agents are incorporated into the toner resins, when using headers or extruders, are between 100° C. and 200° C. Correspondingly, thermal stability at 200° C., and better still at 250° C., is a great advantage. It is also important for the thermal stability to be ensured over a relatively long period (about 30 minutes) and in a variety of binder systems. This is significant because matrix effects occur again and again and lead to the premature decomposition of the charge control agent in the toner resin, causing the toner resin to turn a dark yellow or dark brown color and the charge control effect to be wholly or partly lost. Typical toner binders are resins polymerization, polyaddition and polycondensation resins, such as styrene, styrene-acrylate, styrene-butadiene, acrylate, polyester, phenolic and epoxy resins, individually or in combination, which may also contain further components such as colorants, waxes or flow assistants, or may have these components added subsequently.

It is of great advantage for its good dispersibility if the charge control agent has, as far as possible, no waxlike properties, no tackiness, and a melting or softening point of >150° C., preferably >200° C. Tackiness frequently causes problems during metered addition to the toner formulation, and low melting or softening points may lead to inhomogenous distribution during dispersion, caused by the material coalescing in drops in the carrier material.

Apart from their use in electrophotographic toners and developers, charge control agents may also be used to improve the electrostatic charge of powders and coatings, especially in triboelectrically or electrokinetically sprayed powder coatings as are used to coat surfaces of articles made from, for example, metal, wood, plastic, glass, ceramics, concrete, textile material, paper or rubber. Powder coating technology is used, for example, when coating small articles, such as garden furniture, camping equipment, household implements, automobile components, refrigerators and shelving, and for coating workpieces of complicated shape. The powder coating or the powder receives its electrostatic charge, in general, according to one of the two following processes:

a) in the corona process, the powder coating or the powder is guided past a charged corona and in so doing is charged;

b) in the triboelectric or electrokinetic process, the principle of frictional electricity is utilized.

In the spray apparatus, the powder coating or the powder receives an electrostatic charge which is opposite to the charge of its friction partner, generally a hose or spray tube made, for example of polytetrafluoroethylene. It is also possible to combine the two processes.

Typical powder coating resins employed are epoxy resins, polyester resins containing carboxyl and hydroxyl groups, polyurethane resins and acrylic resins, together with the conventional curing agents. Combinations of resins are also used. For example, epoxy resins are often employed in combination with polyester resins containing carboxyl and hydroxyl groups. Examples of typical curing agent components for epoxy resins are acid anhydrides, imidazoles and dicyandiamide, and derivatives thereof. Examples of typical curing agent components for polyester resins containing hydroxyl groups are acid anhydrides, blocked isocyanates, bisacylurethanes, phenolic resins and melamine resins. Examples of typical curing agent components for polyester resins containing carboxyl groups are triglycidyl isocyanurates or epoxy resins. Typical curing components used in acrylic resins are, for example, oxazolines, isocyanates, triglycidyl isocyanurates or dicarboxylic acids.

The disadvantage of insufficient charge can be seen above all in triboelectrically or electrokinetically sprayed powders and powder coatings which have been prepared using polyester resins, especially polyesters containing carboxyl groups, or using so-called mixed powders, also referred to as hybrid powders. Mixed powders are powder coatings whose resin base comprises a combination of epoxy resin and polyester resin containing carboxyl groups. Mixed powders form the basis of the powder coatings used most commonly in practice. Inadequate charging of the abovementioned powders and powder coatings results in inadequate throwing powder and an inadequate deposition rate on the workpiece to be coated. The term "throwing power" is a measure of the extent to which a powder or powder coating is deposited on the workpiece to be coated, including its rear faces, cavities, fissures and, in particular, its inner edges and angles.

Colorless charge control agents are claimed in numerous patents. However, the colorless charge control agents of the prior art have a range of disadvantages which severely limit their use in practice and even, in some cases, render it impossible. For instance, the complexes of chromium, iron, cobalt and zinc described in U.S. Pat. No. 4,656,112 also have the disadvantage, in addition to the problem of the heavy metals, that they are in some cases not actually colorless and may consequently be of only limited application in color toners or in white or colored powder coatings. The known quaternary ammonium compounds, which are suitable in principle, are often difficult to disperse, resulting in nonuniform charging of the toner. In addition, a problem which often occurs is that the toner charge produced by these compounds is not stable over a prolonged activation period (up to 24 hours), especially at high temperature and atmospheric humidity, which then leads in the course of a copying or printing process to the accumulation of incorrectly or insufficiently charged toner particles and thus brings the process to a standstill.

Furthermore, it is known that charge control agents based on ammonium and immonium compounds are sensitive to light or mechanical effects (U.S. Pat. No. 4,683,188) and may be thermally labile, and that they form decomposition products which may have an adverse effect on the triboelectric charging of the toner (U.S. Pat. No. 4,684,596) and/or have a strong inherent color, often dark brown. In addition to this, they are often waxlike, and some are water-soluble and/or possess a low effectiveness as charge control agents.

Although suitable in principle, charge control agents based on high-grade fluorinated ammonium and immonium compounds (U.S. Pat. No. 5,069,994) have the disadvantage of a complex synthesis, resulting in high preparation costs for the corresponding substances, and are not sufficiently stable to heat. As charge control agents, phosphonium salts are less effective than ammonium salts (U.S. Pat. No. 4,496,643) and may cause toxicological problems. Charge control agents based on polymeric ammonium compounds (DE-A-4,029,653) lead in some cases to an amine odor of the toner or developer, and the charge control characteristics of these substances can be altered by relatively mild oxidation and the absorption of moisture. Furthermore, the oxidation products are colored and are consequently interfere, especially in color toners. The abovementioned charge control agents for electrophotographic toners and developers, because of their colored nature, are unsuitable for use in the predominantly white or clear triboelectrically or electrokinetically sprayed powders and powder coatings. In addition, inadequate thermal stability severely restricts the use of such charge control agents, since powder coatings, for example, are baked on at over 200° C. for 15 minutes. The charge control agents for powders and powder coatings, which are claimed in U.S. Pat. No. 5,069,994, are difficult to handle because of their waxy nature and water solubility or hygroscopic nature, and are of only limited applicability.

SUMMARY OF THE INVENTION

The object of the present invention was consequently to find improved, particularly effective, colorless charge control agents, it being necessary to ensure not only the level of charge but also the rapid attainment and constancy of this charge, and for the charge control effect to be insensitive to changes in temperature and atmospheric humidity. Moreover, these compounds should have a high level of thermal stability and should also be, in particular, very readily dispersible in the respective carrier material (resin) over a prolonged period, should be only sparingly soluble or insoluble in water, and should be compatible with the components of the toner and powder coating. In addition, the compounds should be relatively straightforward and cost-effective to prepare. The substances should, moreover, satisfy ecological and toxicological requirements such as, for example, the absence of heavy metals, especially chromium. An additional aim is that novel compounds of this type should be able to be employed efficiently in the various application sectors.

It has now become evident that selected cyclic polysulfonyldiallylammonium salts, surprisingly, by specific combination of polysulfonyldiallylammonium cations with selected anions, possess particularly high and constant charge control properties, good thermal stabilities and very good dispersiblities in different binders, for example polystyrene-acrylates or polyesters.

The present invention relates to the use of polysulfonyldiallylammonium salts which are obtainable by a) copolymerization of salts, preferably halides, of monomeric diallylammonium components of the formula (I)

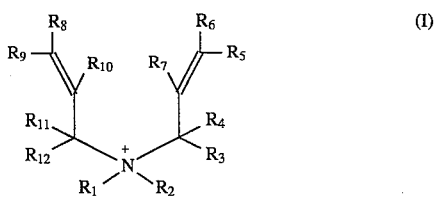

with sulfur dioxide or a compound which liberates sulfur dioxide, and b) anion exchange, the anions, preferably the halide ions, of the diallylammonium components being completely or partially replaced by the anions A, the diallylammonium components in each case cyclized to give a five- or six-membered ring and being connected to one another by one or more divalent radicals —$SO_2$— to form polymers, the polysulfonyldiallylammonium salts having a molecular weight of between 500 and 5,000,000, the ratio of the number of diallylammonium components to the number of divalent $SO_2$ radicals being from 1:0.01 to 1:100, the radicals $R_1$ to $R_{12}$ being identical or different and being a hydrogen atom, a halogen atom, a hydroxyl radical, a primary, secondary or tertiary amino radical, a carboxyl or carboxylate radical, an acyl radical, a sulfo or sulfonate radical, a cyano or nitro radical, or a radical of a $C_1$–$C_{30}$-aliphatic, $C_7$–$C_{60}$-araliphatic or $C_6$–$C_{30}$-aromatic hydrocarbon which may be interrupted by heteroatoms, and A is in each case the stoichiometric anion equivalent of an inorganic anion; of an anion of a heteropolyacid or of a borate of the formula (II)

the radicals $R_{13}$ to $R_{16}$ being identical or different and being $C_1$–$C_{30}$-aliphatic or $C_3$–$C_{10}$-cycloaliphatic radicals, aryl, heteroaryl or aralkyl radicals which may be substituted by alkyl($C_1$–$C_4$), alkoxy($C_1$–$C_4$) or aryl radicals or by halogen atoms, or being fluorine atoms;

or of an organic anion, preferably a phenolate, olefinic, aliphatic or aromatic carboxylate, thiolate, sulfonate or sulfate in which the alkyl, alkenyl or aryl radicals may also be perfluorinated; or of a disulfo-pyrrolidinium betaine of the formula (III)

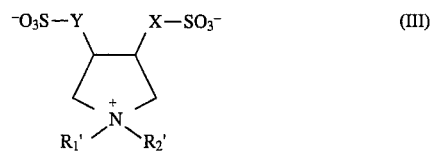

$R_1'$ and $R_2'$ having the meanings given for $R_1$ and $R_2$ and X and Y each being a straight-chain or branched aliphatic, saturated or unsaturated alkylene($C_1$–$C_{18}$) radical or alkoxylene($C_1$–$C_{18}$) radical;

or A is a combination of the abovementioned anions; individually or in combination as charge control agents in electrophotographic toners and developers which are employed for copying and reproducing originals and for printing electronically, magnetically or optically stored information or in colorproofing, and as charge control agents in powders and powder coatings.

The compounds used according to the invention are suitable as charge-improving agents in powders and coatings for the surface coating of articles of metal, wood, plastic, glass, ceramic, concrete, textile material, paper or rubber, especially in triboelectrically or electrokinetically sprayed powder coatings. Moreover, the compounds mentioned can also be employed as charge-improving agents in the form of coatings of carriers or as a component of coatings of carriers which are employed in developers for the electrophotographic copying or reproduction of originals and for the printing of electronically, optically or magnetically stored information or in colorproofing. The invention also relates to the use of a mixture of the stated compounds or of a mixed crystal with mixed anions and/or cations for the purposes mentioned.

DETAILED DESCRIPTION

Examples of inorganic ions A which are of interest for the use according to the invention are $NO_3^-$, $OH^-$, $HSO_4^-$, $SO_4^{2-}$, $HSO_3^-$, $S_2^-$, $SO_3^{2-}$, $S_2O_3^{2-}$, $HCO_3^-$, $CO_3^{2-}$, $H_2PO_4^-$, $HPO_4^{2-}$, $PO_4^{3-}$, $CN^-$, $CF_3COO^-$, cyanate, isocyanate, $F^-$, $Cl^-$, $Br^-$, $I^-$, thiocyanate, tetracyanozincate, tetrathiocyanozincate, perchlorate, $PF_6^-$, molybdates such as $MoO_4^{2-}$, thiomolybdates such as $MoS_4^{2-}$, and tungstates such as $WO_4^{2-}$. A combination of these anions is, however, also suitable, including in particular a combination with organic anions such as $HCOO^-$ or $CH_3COO^-$, as a mixture or as a mixed crystal.

Examples of an anion of a heteropolyacid which are of interest are molybdatophosphates such as $P(Mo_3O_{10})_4^{3-}$, tungstophosphates such as $P(W_3O_{10})_4^{3-}$, and silicomolybdates.

Examples of borates which are of interest are tetrafluoroborate, tetrachloroborate, tetraphenylborate, tetra(fluorophenyl)borate, tetra(chlorophenyl)borate, tetratolylborate, tetranaphthylborate, tetra(methoxyphenyl)borate, tetrabiphenylborate, tetrabenzylborate, tetra(perfluoroalkyl)phenylborate and tetrapyridylborate, in which the stated aromatic radicals can be connected to the boron atom in the ortho, meta or para position.

Examples of organic anions A which are of interest are ethylsulfate, thiolate, phenolate, nitrophenolate, saturated or unsaturated aliphatic, or cycloaliphatic or aromatic carboxylate or sulfonate, preferably formate, lactate, tartrate, benzoate, the mono- or dianion of dithiodibenzoic acid, 4,4'-sulfonyldibenzoate, phthalate, terephthalate, isophthalate, sulfoisophthalate, salicylate, 2-hydroxy-3-naphthoate, 2-hydroxy-6-naphthoate, ethylsulfonate, mono- or dimethylsulfate, phenylsulfonate or tosylate, and also perfluorinated saturated or unsaturated aliphatic or cycloaliphatic or aromatic carboxylate or sulfonate, preferably perfluoroacetate, perfluoro-$(C_1-C_{30})$-alkylbenzoate, perfluoroethylsulfonate or perfluoro$(C_1-C_{30})$-alkylbenzenesulfonate, and saturated or unsaturated aliphatic or cycloaliphatic or aromatic di- and tricarboxylate or di- and trisulfonate, preferably citrate, oxalate and succinate, chlorinated or fluorinated aliphatic, cycloaliphatic or aromatic carboxylate, such as trifluoroacetate, and trifluorosulfonate.

Disulfo-pyrrolidinium betaines of the formula (III) which are of interest are those in which $R_1'$ and $R_2'$ are hydrogen, alkyl$(C_1-C_5)$ or alkoxy$(C_1-C_5)$ radicals, polyoxyalkylene radicals, preferably polyoxyethylene or polyoxypropylene radicals, of the formula (alkylene$(C_1-C_5)$-O)$_n$-R in which R is a hydrogen atom or an alkyl$(C_1-C_4)$ radical and n is a number from 1 to 10, and X and Y are each alkylene$(C_1-C_5)$.

In the context of the use according to the invention, polysulfonyldiallylammonium salts are particularly preferred in which A has the meaning $CF_3SO_3^-$, $BF_4^-$, halide, $B(aryl)_4^-$, $PF_6^-$, $P(Mo_3O_{10})_4^{3-}$ or a disulfo-pyrrolidinium betaine of the formula (III), or is the mono- or dianion of dithiodibenzoic acid.

In the context of the present invention, polysulfonyldiallylammonium salts are also particularly preferred in which $R_1$ to $R_{12}$ and, if appropriate, $R_1'$ and $R_2'$ are hydrogen atoms, straight-chain or branched, saturated or unsaturated alkyl$(C_1-C_{18})$ radicals, polyoxyalkylene radicals, preferably polyoxyethylene and/or polyoxypropylene radicals, of the formula (alkylene$(C_1-C_5)$-O)$_n$-R in which R is a hydrogen atom, an alkyl$(C_1-C_4)$ radical or an acyl radical, in particular the acetyl, benzoyl or naphthoyl radical, and n is a number from 1 to 10; phenyl, naphthyl or pyridyl radicals; tolyl radicals; aralkoxy radicals, in particular methoxyphenyl radicals; alkaryl radicals, in particular benzyl radicals; or cycloalkyl radicals, preferably cyclopentyl or cyclohexyl radicals, or in which the abovementioned radicals additionally contain one or more heteroatoms, preferably nitrogen, oxygen, sulfur, phosphorus or a combination thereof, or in which the abovementioned radicals are substituted by one or more carboxamide radicals, sulfonamide radicals, urethane radicals, keto radicals, primary, secondary or tertiary amino radicals, nitro radicals, ether radicals, in particular alkylene$(C_2-C_4)$-O-alkyl$(C_1-C_4)$, alkyl$(C_1-C_4)$ radicals, alkoxy$(C_1-C_4)$ radicals, aroxy radicals, in particular phenoxy radicals, haloalkyl$(C_1-C_{30})$ radicals, haloalkoxy$(C_1-C_{30})$ radicals, ester radicals, in particular -C(O)O-alkyl$(C_1-C_4)$, one or more halogen atoms, hydroxyl, carboxyl, sulfo, cyano or mercapto groups, or by a combination thereof; or in which $R_1$ and $R_2$ and, if appropriate, $R_1'$ and $R_2'$ together form a saturated or unsaturated, aromatic or nonaromatic 5- to 7-membered ring system, preferably the pyridinium ring system, which may contain further heteroatoms, preferably nitrogen, oxygen, sulfur or a combination thereof, in the ring, in particular the morpholinium ring system, and the ring system may be substituted and/or modified by being fused with or connected by a bridge to other ring systems, in particular the quinolinium ring system.

In the context of the use according to the invention, polysulfonyldiallylammonium salts are particularly preferred in which the anion A is $CF_3SO_3^-$, $PF_6^-$, $P(Mo_3O_{10})_4^{3-}$, $BF_4^-$, mono- or dithiobenzoate, halide or $B(aryl)_4^-$ in which aryl is phenyl, naphthyl, fluorophenyl, chlorophenyl, methoxyphenyl, biphenyl, pyridyl or tolyl or a combination thereof, or is an alkyl-3,4-disulfomethylpyrrolidinium betaine of the formula (III) in which X and Y are each $C_1-C_5$-alkylene and $R_1'$ and $R_2'$ are each hydrogen or methyl;

$R_1$ to $R_{12}$ are identical or different and are hydrogen atoms, straight-chain or branched, saturated or unsaturated alkyl $(C_1-C_8)$ or alkoxy $(C_1-C_8)$ radicals, phenyl, naphthyl or pyridyl, tolyl, methoxyphenyl, benzyl, cyclopentyl or cyclohexyl, or in which the radicals $R_1$ and $R_2$ are substituted by one or more halogen atoms or by one or more of the radicals hydroxyl, carboxyl, sulfo, —NH—C(O)-alkyl$(C_1-C_4)$, —NH—SO$_2$-alkyl$(C_1-C_4)$, —C(O)-alkyl$(C_1-C_4)$, —NH$_2$, —NH[alkyl$(C_1-C_4)$], —N[alkyl$(C_1-C_4)$]$_2$, nitro, alkylene$(C_2-C_4)$-O-alkyl$(C_1-C_4)$, alkyl $(C_1-C_4)$, alkoxy$(C_1-C_4)$, phenoxy, haloalkyl $(C_1-C_4)$, haloalkoxy $(C_1-C_4)$ or —C(O)O-alkyl$(C_1-C_4)$, the molecular weight is between 1000 and 1,000,000 and the ratio of the number of diallylammonium components to the number of divalent SO$_2$ radicals is from 1: 0.1 to 1:10.

In the context of the use according to the invention, polysulfonyldiallylammonium salts are very particularly preferred which contain one or more of the diallylammonium components (1) to (9)

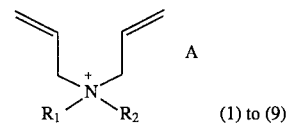

(1) to (9)

in which $R_1$ and $R_2$ each have the meanings H or CH$_3$ and in component (1) A is a 1-alkyl-3,4-disulfomethylpyrrolidinium betaine of the formula (III) in which X and Y are each alkyl$(C_1-C_5)$ and $R_1'$ and $R_2'$ are each H or CH$_3$, in component (2) A has the meaning $BF_4^-$, in component (3) A has the meaning $B(C_6H_5)_4^-$, in component (4) A has the meaning $PF_6^-$, in component (5) A has the meaning 1,1-dialkyl-3,4-disulfomethylpyrrolidinium betaine, in component (6) A has the meaning $P(Mo_3O_{10})_4^{3-}$, in component (7) A has the meaning $CF_3SO_3^-$, in component (8) A has the meaning $HSO_4^-$, in component (9) A has the meaning Cl$^-$, and any desired mixtures or mixed crystals of polysulfonyldiallylammonium salts which contain two or more of components (2) to (9);

the molecular mass of the polysulfonyldiallylammonium salts is between 1000 and 500,000 and the ratio of the number of diallylammonium components to the number of divalent SO$_2$ radicals is 1:1. Also particularly preferred are mixtures or mixed crystals of polysulfonyldiallylammonium salts which contain two or more of components (2), (3), (4) and (7).

In the copolymerization of monomeric diallylammonium compounds with SO$_2$ or a compound which liberates SO$_2$, the diallylammonium cations can cyclize, depending on the preparation process, to form five- or six-membered rings. Cyclization to form five-membered pyrrolidinium rings is carried out in a free-radical intra/intermolcular cyclopolymerization and is described, for example, in EP-A-251,558. Cyclization to form six-membered piperidinium rings is increasingly favored at higher reaction temperature (Houben-Weyl, Methoden der organischen Chemie [Methods of Organic Chemistry], Vol. E 20/II, 1987, pp.

1023–1028) and is described, for example, in DE-A-2,608, 644. The nitrogen atom of the diallylamine can be substituted by alkyl, aryl or heterocyclic groups.

For the purpose according to the invention, polysulfonyldiallylammonium salts with both five- and six-membered ring systems are suitable. It is preferred to employ those with five members, although these may also contain small proportions of the six-membered ring systems.

The sequence of the diallylammonium components and the sulfonyl radicals in the polymer chain can be chosen at will. The sequence of the stated chain units may be cumulative, alternating or atactic.

Some of the polysulfonyldiallylammonium salts which are employed for the use according to the invention are already known and are used in other technical fields. A five-membered ring copolymer of diallylammonium chloride and sulfur dioxide is employed as stabilizer for clays (EP-A-251,558). A six-membered ring copolymer salt containing the anions $Cl^-$ or $Br^-$ is employed as a coating material for glass fibers (JP-59/50,052) or as an active substance against infection by the tobacco mosaic virus (JP-54/151,126). A six-membered ring copolymer salt containing the anions halide, $HSO_4^-$, $HSO_3^-$, $HCO_2^-$ or acetate is employed as an additive in the electrodeposition of zinc (DE-A-2,608,644).

The present invention also relates to a polysulfonyldiallylammonium salt which is obtainable by a) copolymerization of salts, preferably halides, of the monomeric diallylammonium components of the formula (I) with sulfur dioxide or a compound which liberates sulfur dioxide, the diallylammonium cations being cyclized predominantly to form a pyrrolidinium ring and being connected to one another by one or more of the divalent radicals -$SO_2$- to form polymers, and b) anion exchange, the anions, preferably the halide ions, of the diallylammonium components being completely or partially replaced by the anions A mentioned below, the polysulfonyldiallylammonium salts having a molecular weight of between 500 and 5,000,000, preferably between 1000 and 1,000,000, in particular between 1000 and 500,000, the ratio of the number of diallylammonium components to the number of divalent radicals -$SO_2$- being from 1:0.01 to 1:100, preferably from 1:0.1 to 1:10, in particular 1:1, and the radicals $R_1$ to $R_{12}$ in formula (I) being defined as described above and the anion A being the stoichiometric anion equivalent of a heteropolyacid; of a borate of the formula (II); of a disulfopyrrolidinium betaine of the formula (III); of an organic anion; or of an inorganic anion with the exception of chloride.

The present invention also relates to a mixture or a mixed crystal of a polysulfonyldiallylammonium salt containing mixed anions, mixed cations or mixed anions and cations, in which the mixed crystal may also contain chloride.

Examples of heteropolyacids, borates of the formula (II), disulfopyrrolidinium betaines of the formula (III), organic anions and inorganic anions have already been mentioned in the description of the use according to the invention.

Particularly preferred polysulfonyldiallylammonium salts, in the context of the present invention, have already been described above, reference being only to those polysulfonyldiallylammonium salts in which the diallylammonium components are predominantly cyclized to form pyrrolidinium rings.

Very particular preference is given to polysulfonyldiallylammonium salts which contain one or more above-mentioned diallylammonium components (1) to (8).

The invention furthermore relates to a process for the preparation of said polysulfonyldiallylammonium salts by anion exchange. They are prepared by a) dissolving a polysulfonyldiallylammonium halide which has been prepared, for example, in accordance with EP-A-251,558 and in which the halide is fluoride, chloride, bromide or iodide, preferably chloride or bromide and particularly preferably chloride, in water or in a mixture of water and an organic solvent which is completely or partly miscible with water, b) adding to the solution prepared in a) one or more compounds forming the basis for the anion A, preferably the sodium salt of the anion A, at a temperature of between 0° C. and 100° C., preferably between 10° C. and 70° C., and at a pH of between 3 and 10, preferably between 5 and 8, and c) then precipitating the resulting polysulfonyldiallylammonium salt, if necessary, by salting it out with a halogen-containing salt, for example potassium chloride. The polysulfonyldiallylammonium salts are often so insoluble in water or in the stated water/solvent mixture that they precipitate from the solution even without additional salting out.

d) after precipitation, largely freeing the precipitated polysulfonyldiallylammonium salts from inorganic salts, especially from sodium chloride or potassium chloride, by a suitable method, for example by washing or by a reverse osmosis procedure, and subsequently e) drying in vacuo at elevated temperature, preferably at from 70° C. to 100° C.

The salt content of the compounds prepared by the process according to the invention is less than 3% by weight, preferably less than 1.5% by weight, and the water content is less than 5% by weight, preferably less than 2.5% by weight.

The compounds prepared by the process according to the invention are distinguished by a specific resistance in the range from $10^4$ to $10^{16}$ ohm×cm, preferably from $10^6$ to $10^{16}$ ohm×cm, and by a dielectric constant $\epsilon$ in the range from 2 to 14, preferably from 3 to 12.

Depending on the precipitation conditions, such as rate of addition, concentration of the reactants and temperature, the polysulfonyldiallylammonium salts obtained are amorphous or partially crystalline.

The preparation of polydiallylammonium-sulfonyl chlorides is described in the literature [e.g. S. Harada and K. Arai, Makromol. Chem. 107, (1967) 64; Y. Negi, Harada, S. and Katayama, M., Makromolekulare Chem. 90, (1966) 177; DE-A-1 957 756]. The compounds are prepared, for example, by reacting allyl halides with allylamines, quaternizing the resulting diallylamines and then polymerizing the products in the presence of $SO_2$ or a compound which liberates $SO_2$, for example an $SO_2$-solvent adduct, in particular an $SO_2$-acetone adduct, an $SO_2$-dimethyl sulfoxide adduct, an $SO_2$-methanol adduct or a mixture of the adducts mentioned, with or without the action of a catalyst. $SO_2$ can also be liberated by a retro-Diels-Alder reaction of an $SO_2$-butadiene adduct.

The preparation process mentioned for polydiallylammonium-sulfonyl halides also applies analogously to those in which the radicals $R_1$ to $R_{12}$ have the above-mentioned meanings.

Disulfo-pyrrolidinium betaines of the formula (III) can be prepared in accordance with, for example, U.S. Pat. No. 4,877,885.

In a preferred embodiment, anion exchange is carried out in a mixture of water and isopropanol, water and isobutanol or water and methyl isobutyl ketone.

In a further preferred embodiment, the polydiallylammonium-sulfonyl chloride is reacted with sodium tetraphenylborate, sodium tetra-o-fluorophenylborate, sodium tetra-m-fluorophenylborate, sodium tetra-p-fluorophenylborate, sodium tetra-o-chlorophenylborate, sodium tetra-m-chlorophenylborate, sodium tetra-p-chlorophenylborate, sodium tetra-o-tolylborate, sodium tetra-m-tolylborate, sodium tetra-p-tolylborate, sodium tetra-1-naphthylborate sodium tetra-2-naphthylborate, sodium tetra-o-methoxyphenylborate, sodium tetra-m-methoxyphenylborate, sodium tetra-p-methoxyphenylborate, sodium tetra-o-biphenylborate, sodium tetra-m-biphenylborate, sodium tetra-p-biphenylborate, sodium tetrabenzylborate, sodium tetra-o-pyridylborate, sodium tetra-m-pyridylborate, sodium tetra-p-pyridylborate, tetra(perfluoroalkyl)phenylborate or sodium tetrafluoroborate.

The polysulfonyldiallylammonium salts specified according to the invention are colorless and have particularly high and constant charge control properties, good thermal stabilities and are very readily dispersible. A great technical advantage of the very readily dispersible compounds lies in the possibility of employing substances from the same class of compound, depending on the carrier/resin combination, either as positive or negative charge control agents. Consequently, both positive and negative toners can be prepared from a fixed toner base formulation (comprising toner binder, colorant, flow assistant and, if desired, other components) by selecting the desired carrier and/or resin and by a suitable cation/anion combination of the compounds according to the invention.

In comparison with the polymeric compounds known from DE-A-4,029,652 and DE-A-4,029,653, the cyclic polysulfonyldiallylammonium salts according to the invention are easier to isolate and to dry and have a distinctly improved dispersibility in the binder.

Of quite particular advantage in connection with the compounds according to the invention is their less complicated synthesis, their cost-effective preparation, and their high activity, excellent thermal stability and general resin compatibility combined with a good deposition ratio and throwing power. Particularly important as regards their use in industry is their very ready dispersibility, resulting overall in an efficient and economic utilization of sprayed powder coatings.

A further advantage of the compounds used according to the invention is that they are colorless and have a high charge control effect, and that this effect is constant over a prolonged activation period (up to 24 hours).

For instance, a test toner containing 1 percent by weight of a polysulfonyldiallylammonium tetraphenylborate exhibits after 10 minutes a charge of −16 μC/g, after 30 minutes −25 μC/g, after 2 hours −32 μC/g and after 24 hours −33 μC/g (Application Example 1).

The high charge control effect is all the more marked when compared with the charge characteristics of the pure toner binder (e.g. styrene/acrylate resin) (Comparative Example 1): −4 μC/g after 10 minutes, −12 μC/g after 30 minutes, −27 μC/g after 2 hours and −48 μC/g after 24 hours.

Table 1 summarizes, by way of example, the test toner measurements for compounds 2, 3, 4, 6, 7 and 9.

TABLE 1

| | 1% test toner, styrene-acrylate resin; charge in μC/g; (Comp. = compound) | | | | | |
|---|---|---|---|---|---|---|
| Compd. | Anion | 5 min | 10 min | 30 min | 2 h | 24 h |
| (2) | $BF_4^-$ | −7 | −10 | −15 | −20 | −30 |
| (3) | $B(C_6H_5)_4^-$ | −10 | −16 | −25 | −32 | −33 |
| (4) | $PF_6^-$ | +3 | +3 | +3 | +2 | +2 |
| (6) | $P(Mo_2O_{10})_4^{3-}$ | −5 | −8 | −14 | −22 | −34 |
| (7) | $CF_3SO_3^-$ | +1 | −1 | −5 | −17 | −32 |
| (9) | $Cl^-$ | −5 | −9 | −15 | −23 | −30 |
| resin | — | | −2 | −4 | −12 | −27 | −48 |

For their use in practice, it is of great importance that the compounds used according to the invention are chemically inert and highly compatible with binders, for example styrene-acrylates, polyesters, epoxides and polyurethanes. In addition, the compounds are thermally stable and can thus be incorporated without difficulties into the conventional binders by conventional methods (extrusion, kneading) under the usual conditions (temperatures of between 100° C. and 200° C). The synthesis of the compounds according to the invention is less complicated, and the products are obtained in high purity.

A comparison both with the pure powder coating resin component (Comparative Example 2) and with a polymeric ammonium compound (Comparative Example 3) known from DE-A-4 029,652, Preparation Example 2, indicates a distinct improvement in the deposition ratio by the use of the polysulfonyldiallylammonium salts according to the invention.

The compounds used according to the invention are incorporated, individually or in combination with one another, homogenously—for example by extrusion or heading—in a concentration of from 0.01 to 50 percent by weight, preferably from 0.1 to 5.0 percent by weight, based on the total mixture, into the binder of the respective toner, developer, coating material or powder coating. In this context, the charge control agents for toners or the charge-improving agents for powders and coatings for surface coating, in particular for triboelectrically or electrokinetically sprayed powder coatings, can be added as dried and ground powders, dispersions or solutions, filter cakes, masterbatches, as compounds coated from aqueous or nonaqueous solution onto suitable carriers, for example silica gel, $TiO_2$, $Al_2O_3$, or in some other form. Similarly, it is in principle also possible to add the compounds used according to the invention even during the preparation of the respective binders, i.e. in the course of their polymerization, polyaddition or polycondensation.

The level of electrostatic charging of the electrophotographic toners or of the powder coatings in which the charge control agents according to the invention are homogenously incorporated is measured in standard test systems under identical conditions (identical dispersion times, identical particle size distribution, identical particle shape) at approximately 20° C. and 50% relative atmospheric humidity. The toner is electrostatically charged by being brought together turbulently on a roller bench (150 revolutions per minute) with a carrier, i.e. a standardized frictional component (3 parts by weight of toner to 97 parts by weight of carrier). The electrostatic charge is then measured on a conventional q/m measurement setup (J. H. Dessauer, H. E. Clark, "Xerography and related Processes", Focal Press, N.Y., 1965, page 289; J. F. Hughes, "Electrostatic Powder Coating", Research Studies Press Ltd., Letchworth, Hertfordshire, England, 1984, chapter 2). The particle size has a great influence when determining the q/m value or the triboelectric charge of powder coatings, which is why strict attention is paid to a uniform particle size distribution when screen-classifying the samples of toner or powder coating obtained. For instance, a mean particle size of 10 μm is aimed at for toners, whereas for powder coatings a mean particle size of 50 μm is practicable.

The triboelectric spraying of the powder (coatings) is carried out using a spray gun with a standard spray pipe and a star-shaped inner rod at maximum powder throughput with a spray pressure of 3 bar. For this purpose, the article to be sprayed is suspended in a spraybooth and sprayed from a distance of about 20 cm directly from the front, without any further movement of the spray gun. The charge of each sprayed powder is then measured using a "device for measuring the triboelectric charge of powders" from Intec (Dortmund). To carry out the measurements the antenna of the measuring device is held directly in the cloud of powder emerging from the spray gun. The current strength resulting from the electrostatic charge of powder coating or powder is indicated in μA. The deposition ratio, is then determined in % by differential weighing of the sprayed and of the deposited powder coating.

The examples below are intended to illustrate the invention without limiting it to them. "Min" denotes minutes and "h" denotes hours.

PREPARATION EXAMPLES 1) polysulfonyldiallylammonium tetraphenylborate 79.6 g (0.3 mol, based on the monomer unit) of polysulfonyldiallyldimethylammonium chloride (preparation: S. Harada and K. Arai, Makromol. Chem. 107, (1967) 64; Y. Negi, S. Harada and M. Katayama, Makromolekulare Chem. 90, (1966) 177; DE-A-1 957,756) are dissolved in 2 l of deionized water at 70° C. with stirring. A solution of 104.8 g of $NaB(C_6H_5)_4$ (0.3 mol) in 500 ml of deionized water, dissolved at room temperature, is added dropwise to the first solution over a period of 10 min at a temperature of 70° C. with stirring (200 rpm). A white solid is precipitated spontaneously. To complete the reaction, the suspension is subsequently stirred for 30 min at 70° C. (100 rpm) and then filtered off with suction through a frit. A further 100 ml of a 10% strength aqueous solution of $NaB(C_6H_5)_4$ are added to the filtrate, and the subsequent precipitate formed is filtered off with suction. The combined filtration residues are washed 3 times until free of salt using 2.5 l of deionized water each time, and dried at 80° C. in a vacuum drying oven (200 mbar). The fine white powder obtained after drying can be employed without further working-up as a charge control agent for preparing test toners.

Yield: 151.3 g (99% of theory) Decomposition: >170° C. Elemental analysis: C 71.0; H 7.3; N 3.0; S 6.3; B 1.7 (found) (in %) C 75.0; H 7.1; N 2.8; S 6.3; B 2.0 (calculated) $H_2O$: 2.4%; resistivity: $1\times10^{14}$ ohm×cm; ε (at 1 kHz): 4.9.

2) Polysulfonyldiallyldimethylammonium tetrafluoroborate 11.36 g (0.05 mol) of polysulfonyldiallyldimethylammonium chloride are dissolved in 330 ml of deionized water at 60° C. with stirring, and a solution of 5.66 g of $NaBF_4$ (0.05 mol) and 50 ml of deionized water is added at 60° C. over a period of 2 min. Subsequent reaction is carried out analogously to Preparation Example 1.

Yield: 12.2 g (88% of theory) Decomposition: >160° C. Elemental analysis: C 33.4; H 6.2; N 4.9; S 10.7; B 3.2; F 22.2 (found) (in %) C 34.7; H 6.2; N 5.1; S 11.6; B 3.9; F 27.4 (calculated) $H_2O$: 4.9%.

3) Polysulfonyldiallyldimethylammonium molybdophosphate 33.4 g (0.15 mol) of polysulfonyldiallyldimethylammonium chloride are dissolved in 330 ml of deionized water at 70° C. with stirring, and a solution of 94.6 g of $Na_3[P(Mo_3O_{10})_4]^{3-}$ (corresponds to 1/3×0.15 mol) and 1.8 l of deionized water is added at 70° C. over 20 min. Subsequent reaction is carried out analogously to Preparation Example 1.

Yield: 119.6 g (33% of theory) Decomposition: >210° C. Elemental analysis: C 17.1; H 3.2; N 3.0; S 4.3; P 1.2; Mo 41.5 (found) (in %) C 12.4; H 2.0; N 1.8; S 4.1; P 1.3; Mo 48.1 (calculated) $H_2O$: 1.6%.

4) Polysulfonyldiallyldimethylammonium hexafluorophosphate 11.36 g (0.05 mol) of polysulfonyldiallyldimethylammonium chloride are dissolved in 330 ml of deionized water at 60° C. with stirring, and a solution of 9.4 g of $KPF_6$ (0.05 mol) and 80 ml of deionized water is added at 60° C. over a period of 3 min. Subsequent reaction corresponds to Preparation Example 1.

Yield: 15.2 g (91% of theory) Decomposition: >130° C. Elemental analysis Found: C 29.3%; H 4.4%; N 4.1%; F 31.5%; S 9.5%; P 9.0% Calc.: C 28.6%; H 4.7%; N 4.2%; F 34.0%; S 9.0%; P 9.2% $H_2O$: 2.05%.

5) Polysulfonyldiallyldimethylammonium trifluoromethanesulfonate 11.36 g (0.05 mol) of polysulfonyldiallyldimethylammonium chloride are dissolved in 330 ml of deionized water at 60° C. with stirring, and a solution of 8.6 g of $NaCF_3SO_3$ (0.05 mol) and 80 ml of deionized water is added at 60° C. over a period of 3 min. Subsequent reaction is carried out analogously to Preparation Example 1.

Yield: 19.6 g (92% of theory) Decomposition: >250° C. Elemental analysis: Found: C 31%; H 4.4%; F 15.2%; N 3.9%; S 17.4% Calc.: C 29%; H 4.3%; F 15.2%; N 3.7%; S 17.1% $H_2O$: 1.2% Resistivity: $1\times10^8$ ohm×cm; ε (50 kHz) : 9.2

Application Example 1

1.0 part of the compound from Preparation Example 1 is incorporated homogenously using a kneader into 99.0 parts of a toner binder (styrene/methacrylate copolymer, 60:40) over 45 min. The mixture is then ground in a universal laboratory mill and subsequently classified in a centrifugal classifier. The desired particle fraction (4 to 25 μm) is activated with a carrier which comprises magnetite particles with a size of from 50 to 200 μm coated with styrene/methacrylate copolymer, 90:10.

Measurement is carried out using a conventional q/m measurement setup. A screen with a mesh size of 25 μm is used to ensure that, when the toner is blown out, no carrier is ejected with it. Measurements are carried out at 20° C. and 50% relative atmospheric humidity. As a function of the activation period, the following q/m values [μC/g] are measured:

| activation period | charge q/m [μC/g] |
| --- | --- |
| 10 min | −16 |
| 30 min | −25 |
| 2 h | −32 |
| 24 h | −33 |

Application Examples 2, 3 and 4

1 part of each of the compounds from Preparation Examples 2, 3 and 4 are incorporated homogenously, as described in Application Example 1, into 99 parts each of toner binder. As a function of the activation period, the following q/m values [μC/g] are measured:

| activation period compound from | charge q/m [μC/g] | | |
| --- | --- | --- | --- |
| Preparation Example: | 2 | 3 | 4 |
| 10 min | −10 | −8 | +3 |
| 30 min | −15 | −14 | +3 |

-continued

| activation period compound from | charge q/m [μC/g] | | |
|---|---|---|---|
| Preparation Example: | 2 | 3 | 4 |
| 2 h | −20 | −22 | +2 |
| 24 h | −30 | −34 | +2 |

Application Example 5

1 part of the compound from Preparation Example 1 is incorporated homogenously, as described in Application Example 1, into 99 parts of a powder coating binder based on a carboxyl-containing polyester resin. To determine the deposition ratio, 30 g of the test powder coating are sprayed at a defined pressure by means of a triboelectric spray gun as described above. By differential weighing, the amount of powder coating deposited can be determined and a deposition ratio in % defined, and a current flow (μA) can be measured as a result of the charge transfer.

| pressure [bar] | current [μA] | deposition ratio [%] |
|---|---|---|
| 3 | 1.4–1.8 | 20 |
| 5 | 2.6–2.9 | 16 |

Application Example 6

In each case 1 part of the compound from Preparation Example 5 is incorporated homogenously, as described in Application Example 1, into 99 parts each of toner binder. As a function of the activation period, the following q/m values [μC/g] are measured:

| activation period | charge q/m [μC/g] |
|---|---|
| 10 min | −4 |
| 30 min | −5 |
| 2 h | −17 |
| 24 h | −32 |

Comparative Example 1

The procedure of Application Example 1 is followed to make a measurement using the pure toner binder, but without incorporating additives by heading.

| activation period | charge q/m [μC/g] |
|---|---|
| 10 min | −4 |
| 30 min | −12 |
| 2 h | −27 |
| 24 h | −48 |

Comparative Example 2

The procedure of Application Example 5 is followed to determine the deposition ratio of the pure powder coating binder.

| pressure [bar] | current [μA] | deposition ratio [%] |
|---|---|---|
| 3 | 0.1 | 5 |

Comparative Example 3

The procedure of Application Example 6 is followed to determine the triboelectric charging characteristics of the polymeric ionic ammonium compound of DE-A-4,029,652,

PREPARATION EXAMPLE 2:

| activation period | charge q/m [μC/g] |
|---|---|
| 10 min | −8 |
| 30 min | −8 |
| 2 h | −9 |
| 24 h | −10 |

The procedure of Application Example 5 is followed to determine the characteristic data for the triboelectric spraying of the powder coating comprising the polymeric ammonium compound of Preparation Example 2 of DE-A-4,029,652.

| pressure [bar] | current [μA] | deposition ratio [%] |
|---|---|---|
| 3 | 0.7–0.9 | 18 |

We claim:

1. A method for providing control over the electrostatic charge of an electrostatically chargeable electrophotographic toner or developer composition or electrostatically chargeable composition for printing stored information or electrostatically chargeable colorproofing composition or electrostatically chargeable powdered coating composition for the coating of a surface of an article, said method comprising: incorporating homogeneously into a said composition as a charge control agent a polysulfonyldiallylammonium salt or mixture or mixed crystal of a said polysulfonyldiallylammonium salt with mixed anions, mixed cations, or mixed anions and cations which has been obtained by a) copolymerization of a salt of a monomeric diallylammonium component of the formula (I)

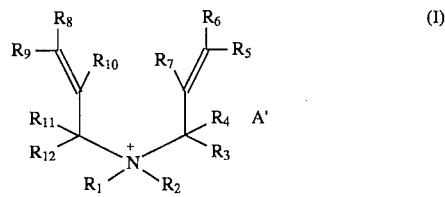

with sulfur dioxide or a compound which liberates sulfur dioxide, the diallylammonium cations being cyclized generally to form a pyrrolidinium ring and being connected to one another by one or more of the divalent radicals —$SO_2$— to form polymers, and b) anion exchange, the anions A' of the resulting repeating diallylammonium units being completely or partially replaced by the anions A, the repeating diallylammonium units being in each case cyclized to give a five- or six-membered ring and being connected to one another by one or more divalent radicals —SO$_2$— to form polymers, the polysulfonyldiallylammonium salt having a molecular weight of between 500 and 5,000,000, the ratio of the number of repeating diallylammonium units to the number of divalent SO$_2$ radicals being from 1:0.01 to 1:100, the radicals R$_1$ to R$_{12}$ being identical or different and being a hydrogen atom, a halogen atom, a hydroxyl radical, a primary, secondary or tertiary amino radical, a carboxyl or carboxylate radical, an acyl radical, a sulfo or sulfonate radical, a cyano or nitro radical, or a radical of a C$_1$–C$_{30}$-aliphatic, C$_7$–C$_{60}$-araliphatic or C$_6$–C$_{30}$-aromatic hydrocarbon optionally interrupted by one or more of the heteroatoms, nitrogen, sulfur or oxygen, and A' is an anion, A is in each case the stoichiometric anion equivalent of an inorganic anion; of an anion of a heteropolyacid or of a borate of the formula (II)

the radicals R$_{13}$ to R$_{16}$ being identical or different and being C$_1$–C$_{30}$-aliphatic or C$_3$–C$_{10}$-cycloaliphatic radicals, aryl, heteroaryl or aralkyl radicals optionally substituted by alkyl(C$_1$–C$_4$), alkoxy(C$_1$–C$_4$) or aryl radicals or by halogen atoms, or being fluorine atoms; or of an organic anion; or of a disulfopyrrolidinium betaine of the formula (III)

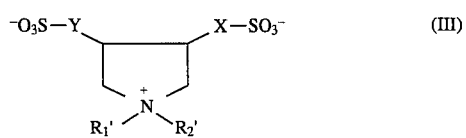

R$_1$' and R$_2$' having the meanings given for R$_1$ and R$_2$ and X and Y each being a straight-chain or branched aliphatic, saturated or unsaturated alkylene(C$_1$–C$_{18}$) radical or alkoxylene(C$_1$–C$_{18}$) radical;

or A is a combination of the abovementioned anions; the anions A' of which have been completely or partially replaced by said anion A.

2. The method as claimed in claim 1, said method comprising: incorporating homogeneously into a coating or carrier or a component of a coating or carrier which is employed in a developer for the electrophotographic copying or reproduction of originals or in a composition for the printing of electronically, optically or magnetically stored information or in colorproofing, as the charge-control agent thereof, a said polysulfonyldiallylammonium salt.

3. The method as claimed in claim 1, wherein the anions A comprise inorganic anions, and said inorganic anions are the stoichiometric amount of anion equivalent of NO$_3^-$, OH$^-$, HSO$_4^-$, SO$_4^{2-}$, HSO$_3^-$, S$_2^-$, S$^{2-}$, SO$_3^{2-}$, S$_2$O$_3^{2-}$, HCO$_3^-$, CO$_3^{2-}$, H$_2$PO$_4^-$, HPO$_4^{2-}$, PO$_4^{3-}$, CN$^-$, CF$_3$SO$_3^-$, CF$_3$COO$^-$, cyanate, isocyanate, F$^-$, Cl$^-$, Br$^-$, I$^-$, thiocyanate, tetracyanozincate, tetrathiocyanozincate, perchlorate, PF$_6^-$, MoO$_4^{2-}$, MoS$_4^{2-}$, WO$_4^{2-}$ or a combination thereof.

4. The method as claimed in claim 1, wherein the anions A comprise heteropolyacid anions, and said heteropolyacid anions are P(Mo$_3$O$_{10}$)$_4^{3-}$, P(W$_3$O$_{10}$)$_4^{3-}$ or a silicomolybdate.

5. The method as claimed in claim 1, wherein the anions A comprise a borate of the formula (II), said borate being tetrafluoroborate, tetrachloroborate, tetraphenylborate, tetra(fluorophenyl)borate, tetra(chlorophenyl)borate, tetratolylborate, tetranaphthylborate, tetra(methoxyphenyl)borate, tetrabiphenylborate, tetrabenzylborate, tetra(perfluoroalkyl)phenylborate or tetrapyridylborate.

6. The method as claimed in claim 1, wherein the anions A comprise organic anions, and said organic anions are ethylsulfate, thiolate, phenolate, nitrophenolate, saturated or unsaturated, substituted or unsubstituted aliphatic, or cycloaliphatic or aromatic mono- or di-carboxylate or sulfonate aromatic monothio or dithio carboxylate, ethylsulfonate, mono- or dimethylsulfate, phenylsulfonate or tosylate, or perfluorinated saturated or unsaturated aliphatic or cycloaliphatic or aromatic carboxylate or sulfonate, or saturated or unsaturated aliphatic or cycloaliphatic or aromatic di- or tricarboxylate or di- or trisulfonate, oxalate or succinate, or chlorinated or fluorinated aliphatic, cycloaliphatic or aromatic carboxylate or sulfonate.

7. The method as claimed in claim 1, wherein, in the disulfopyrrolidinium betaine of the formula (III), R$_1$' and R$_2$' each have the meaning of hydrogen, alkyl(C$_1$–C$_5$), alkoxy(C$_1$–C$_5$), polyoxyalkylene radicals, preferably polyoxyethylene or polyoxypropylene radicals, of the formula (alkylene(C$_1$–C$_5$)-O)$_n$-R in which R is a hydrogen atom or an alkyl(C$_1$–C$_4$) radical and n is a number from 1 to 10, and X and Y are each alkylene(C$_1$–C$_5$).

8. The method as claimed in claim 1, wherein R$_1$ to R$_{12}$ are hydrogen atoms, straight-chain or branched, saturated or unsaturated alkyl(C$_1$–C$_{18}$) radicals, polyoxyalkylene radicals of the formula (alkylene(C$_1$–C$_5$)-O)$_n$-R in which R is a hydrogen atom, and alkyl(C$_1$–C$_4$) radical or an acyl radical, and n is a number from 1 to 10; phenyl, naphthyl or pyridyl radicals; tolyl radicals; aralkoxy radicals; alkaryl radicals or cycloalkyl radicals or in which the abovementioned radicals additionally contain one or more heteroatoms, or in which the abovementioned radicals are substituted by one or more carboxamide radicals, sulfonamide radicals, urethane radicals, keto radicals, primary, secondary or tertiary amino radicals, nitro radicals, ether radicals, alkyl(C$_1$–C$_4$) radicals, alkoxy(C$_1$–C$_4$) radicals, aroxy radicals, haloalkyl(C$_1$–C$_{30}$) radicals, haloalkoxy(C$_1$–C$_{30}$) radicals, ester radicals, one or more halogen atoms, hydroxyl, carboxyl, sulfo, cyano or mercapto groups, or by a combination thereof; or in which R$_1$ and R$_2$ and optionally R$_1$' and R$_2$' together form a saturated or unsaturated, aromatic or nonaromatic 5- to 7-membered ring system, which optionally contains further heteroatoms in the ring, and the ring system is optionally substituted or modified by being fused with or connected by a bridge to one or more other ring systems.

9. The method as claimed in claim 1, wherein the anion A is CF$_3$SO$_3^-$, PF$_6^-$, P(Mo$_3$O$_{10}$)$_4^{3-}$, BF$_4^-$, mono- or dithiobenzoate, halide or B(aryl)$_4^-$ in which aryl is phenyl, naphthyl, fluorophenyl, chlorophenyl, methoxyphenyl, biphenyl, pyridyl or tolyl or a combination thereof, or is an alkyl-3,4-disulfomethylpyrrolidinium betaine of the formula (III) in which X and Y are each C$_1$–C$_5$-alkylene and R$_1$' and R$_2$' are each hydrogen or methyl; R$_1$ to R$_{12}$ are identical or different and are hydrogen atoms, straight-chain or branched, saturated or unsaturated alkyl(C$_1$–C$_8$) or alkoxy(C$_1$–C$_8$) radicals, phenyl, naphthyl or pyridyl, tolyl, methoxyphenyl, benzyl, cyclopentyl or cyclohexyl, or in which the radicals R$_1$ and R$_2$ are substituted by one or more halogen atoms or by one or more of the radicals hydroxyl, carboxyl, sulfo, —NH-C(O)-alkyl(C$_1$–C$_4$), —NH-SO$_2$-alkyl(C$_1$–C$_4$), —C(O)alkyl(C$_1$–C$_4$), —NH$_2$, —NH

[alkyl($C_1$–$C_4$)], —N[alkyl($C_1$–$C_4$)]$_2$, nitro, alkylene-($C_2$–$C_4$)-O-alkyl($C_1$–$C_4$), alkyl($C_1$–$C_4$), alkoxy($C_1$–$C_4$), phenoxy, haloalkyl($C_1$–$C_4$), haloalkoxy($C_1$–$C_4$) or —C(O)O-alkyl($C_1$–$C_4$), the molecular weight is between 1000 and 1,000,000 and the ratio of the number of diallylammonium component radicals to the number of divalent $SO_2$ radicals is from 1:0.1 to 1:10.

10. The method as claimed in claim 1, wherein the polysulfonyldiallylammonium salt contains one or more of the diallylammonium components (1) to (9)

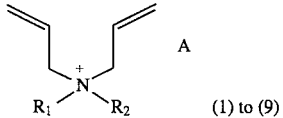 (1) to (9)

in which $R_1$ and $R_2$ each have the meanings H or $CH_3$, and in component (1) A is a 1-alkyl-3,4-disulfomethyl-pyrrolidinium betaine of the formula (III) in which X and Y are each alkyl($C_1$–$C_5$) and $R_1'$ and $R_2'$ are each H or $CH_3$, in component (2) A has the meaning $BF_4^-$, in component (3) A has the meaning $B(C_6H_5)_4^-$, in component (4) A has the meaning $PF_6^-$, in component (5) A has the meaning 1,1-dialkyl-3,4-disulfomethylpyrrolidinium betaine, in component (6) A has the meaning $P(Mo_3O_{10})_4^{3-}$, in component (7) A has the meaning $CF_3SO_3^-$, in component (8) A has the meaning $HSO_4^-$, in component (9) A has the meaning $Cl^-$, and any desired mixtures or mixed crystals of polysulfonyldiallylammonium salts which contain two or more of the components (2) to (9); the molecular mass of the polysulfonyldiallylammonium salts being between 1000 and 500,000 and the ratio of the number of diallylammonium component radicals to the number of divalent $SO_2$ radicals is 1:1.

11. The method as claimed in claim 2, wherein one polysulfonyldiallylammonium salt or a combination of said salts is homogeneously incorporated into a said composition in a concentration of from 0.01 to 50% by weight, based on the total mixture.

* * * * *